United States Patent [19]
Rothell

[11] 3,866,544
[45] Feb. 18, 1975

[54] TRAILER BULKHEAD

[76] Inventor: Floyd W. Rothell, P.O. Box 232, Anson, Tex. 79501

[22] Filed: May 23, 1974

[21] Appl. No.: 472,807

[52] U.S. Cl. ......... 105/376, 105/369 A, 105/369 S, 280/179 R
[51] Int. Cl. ............................................. B60p 7/14
[58] Field of Search ........ 105/369 R, 369 A, 369 B, 105/369 BA, 369 S, 369 D, 376; 214/10.5 R; 296/1 R, 28 M; 280/179 R

[56] References Cited
UNITED STATES PATENTS

| | | | |
|---|---|---|---|
| 2,826,156 | 3/1958 | Hall | 105/376 X |
| 3,637,094 | 1/1972 | Grey | 105/376 X |
| 3,762,341 | 10/1973 | Adler | 105/369 A X |
| 3,779,174 | 12/1973 | Doyle et al. | 105/376 |
| 3,782,758 | 1/1974 | Williamson | 105/376 X |

Primary Examiner—Robert S. Ward, Jr.
Assistant Examiner—Gene A. Church
Attorney, Agent, or Firm—John N. Randolph

[57] ABSTRACT

An adjustable bulkhead for the forward end of a freight carrying trailer having manually actuated means for moving the bulkhead rearwardly from a forwardmost position, after loading of the trailer, into abutting engagement with the forward end of the load, and for anchoring the bulkhead to the trailer to prevent movement of the bulkhead and shifting of the load in transit. The bulkhead includes hinged side members which embrace portions of the sides of the load to assist in preventing any displacement of the load relative to the trailer deck.

7 Claims, 8 Drawing Figures

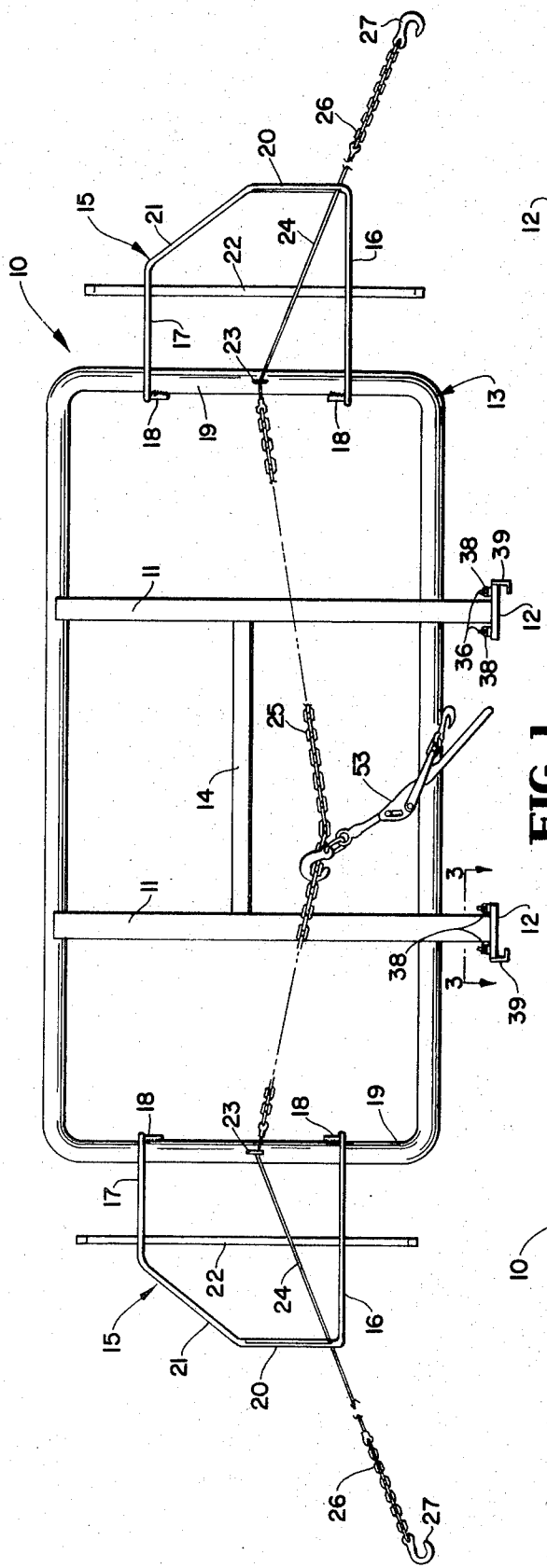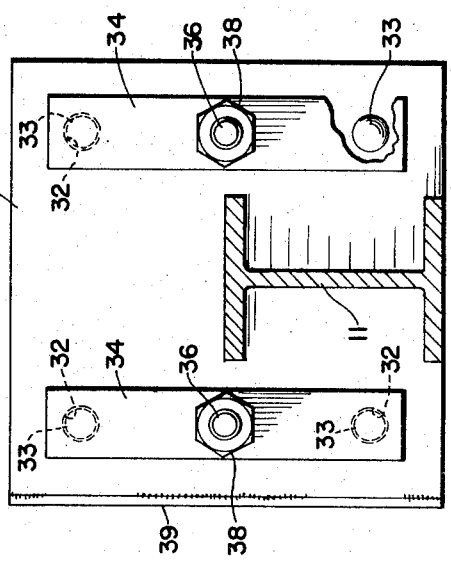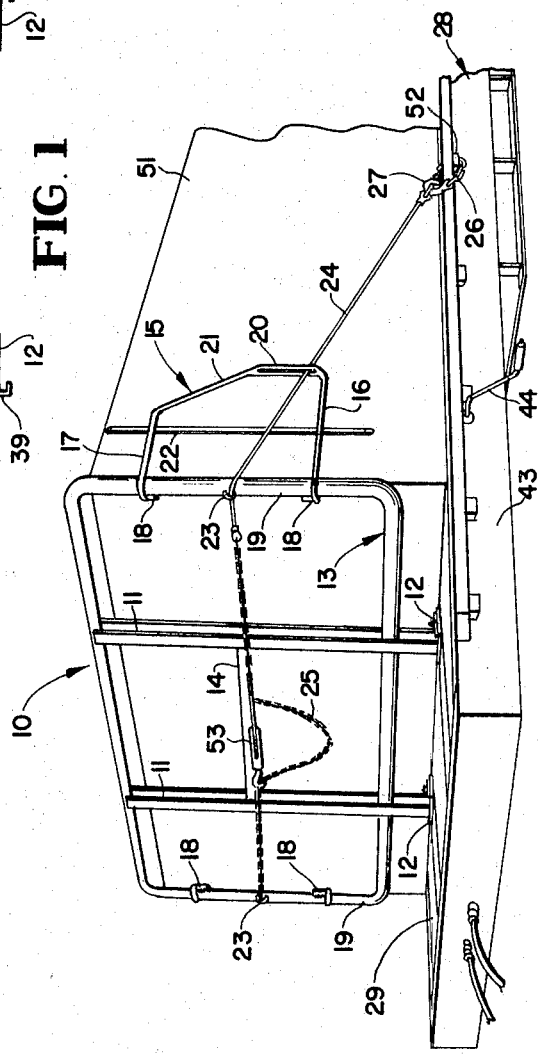

TRAILER BULKHEAD

SUMMARY

It is a primary object of the present invention to provide an adjustable bulkhead for platform type freight carrying trailers which will effectively function to prevent the load from moving forward and injuring the driver and cab in the event of a sudden stop or collision.

Another object of the invention is to provide an adjustable bulkhead especially designed for use on trailers carrying wallboard, for holding the load straight and to prevent shuffling together of the wallboard which causes the ends of the boards to break when the stack is unloaded with a forklift.

Another object of the invention is to provide a bulkhead which can be adjusted longitudinally of the trailer deck to hold the load securely and immovably on a trailer and with the weight of the load properly distributed.

Various other objects and advantages of the invention will hereinafter become more fully apparent from the following description of the drawing, illustrating a presently preferred embodiment thereof, and wherein:

BRIEF DESCRIPTION OF THE DRAWINGS

FIG. 1 is a front elevational view showing the bulkhead detached from the trailer and with the hinged sides thereof extended;

FIG. 2 is a fragmentary perspective view looking toward the forward end of a platform trailer and showing the bulkhead anchored thereto and abutting the forward end of a load supported by the trailer;

FIG. 3 is an enlarged horizontal sectional view, taken substantially along a plane as indicated by the line 3—3 of FIG. 1;

DESCRIPTION OF THE PREFERRED EMBODIMENT

Figure 4:
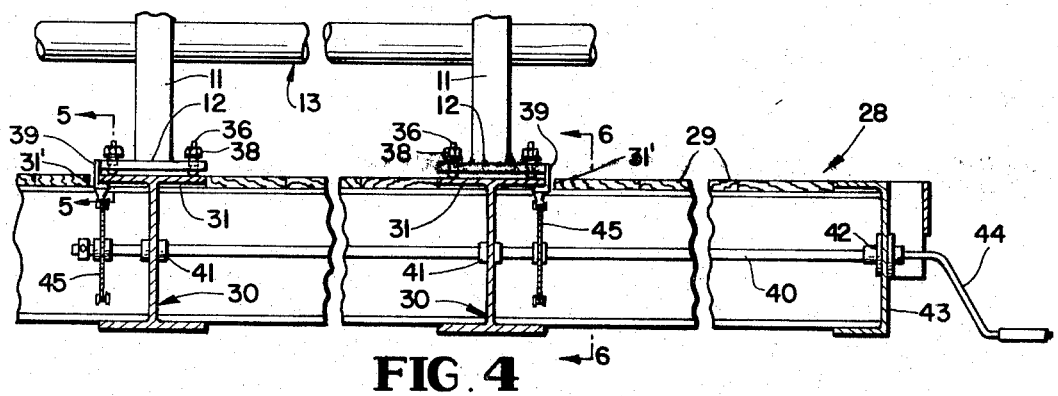
FIG. 4 is an enlarged fragmentary cross sectional view taken through a part of the trailer platform and showing a part of the bulkhead mounted thereon.
Figure 5:
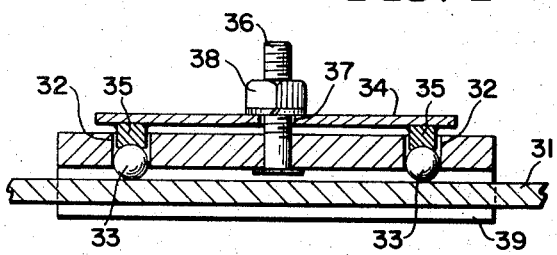
FIG. 5 is an enlarged fragmentary sectional view, taken substantially along a plane as indicated by the line 5—5 of FIG. 4.

Referring more specifically to the drawings, the trailer bulkhead in its entirety and comprising the invention is designated generally 10 and includes a pair of uprights 11 each in the form of an I-beam, as seen in FIG. 3, having foot members or plates 12 welded or otherwise secured to lower ends thereof. An elongated tubular metal frame 13 has one of its longer sides extending through and secured in the webs of the uprights 11, near to but above the plates 12, and its other long side secured to the upper ends of the uprights 11. A brace 14, preferably of angle iron, extends between and is secured to the uprights 11, approximately midway between the longer sides of the frame 13, and cooperates with said longer sides for maintaining the uprights in properly spaced apart substantially parallel relation to one another.

The bulkhead 10 also includes a pair of corresponding side members, each designated generally 15. Each side member 15 includes a rod bent to form a bottom portion 16 and a top portion 17 constituting the end portions thereof, and having terminals which are hinged or pivoted at 18 to an upright end 19 of the member 13. Each side member 15 has an upright slotted outer portion 20 which extends upwardly from the outer end of the bottom portion 16 and an inclined upper outer portion 21 which extends between the upper end of the portion 20 and the outer end of the upper portion 17. Each side member 15 also includes an upright bar 22 which extends from below the bottom portion 16 to above the top portion 17 and which is secured to the inner sides of said portions. One of the side members 15 is hingedly connected to each end part 19, as previously described and as clearly illustrated in FIG. 1.

Eye members 23 are secured to and project from the front sides of the end portions 19, between the hinges 18 thereof. Cables 24 which extend through the slotted portions 20 have inner ends extending through the eyes 23 and which are secured to the ends of a chain 25 which extends substantially the length of the tubular member 13. Chains 26 are connected to the other outer ends of the cables 24 and each chain 26 has a hook 27 at its outer end.

Figure 8:
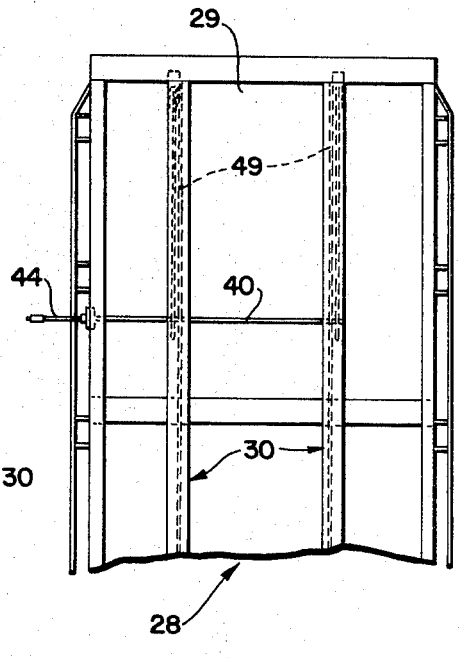
FIG. 8 is a fragmentary top plan view on a reduced scale of the forward portion of the trailer platform.

The forward end of a platform trailer 28 is illustrated in FIGS. 2 and 8 and includes a deck 29 formed in part by two transversely spaced longitudinally extending center beams 30, each in the form of an I-beam as seen in FIG. 4, on the upper flanges 31 of which the plates 12 are supported.

Each plate 12 has an opening 32 adjacent each corner thereof to receive a ball bearing 33. A pair of bars 34 straddle the upright 11 of each plate 12, as seen in FIG. 3, and have depending bosses 35 adjacent the ends thereof which extend into the openings 32 and bear on the ball bearings 33. A threaded stud 36 is fixed to each plate 12 on each side of its upright 11 and extends upwardly therefrom through an opening 37 disposed midway of the ends of each bar 34. A nut 38 threadedly engages each stud 36 and bears on the bar 34 through which said stud extends, for forcing the bar downwardly toward the plate to displace the bosses 35 into the openings 32, so that each plate 12 is supported above and out of contact with the flange 31, over which it is disposed, by the four ball bearings 33 associated therewith to enable the bulkhead 10 to be readily moved longitudinally of the platform 28 on said flanges. An angle member 39 engages under the outer edge of each flange 31 and extends upwardly therefrom through a longitudinal slot 31' in the deck 29, and is secured to the outer edge of the plate 12 disposed thereabove for connecting the bulkhead 10 to the center beams 30.

Figure 6:
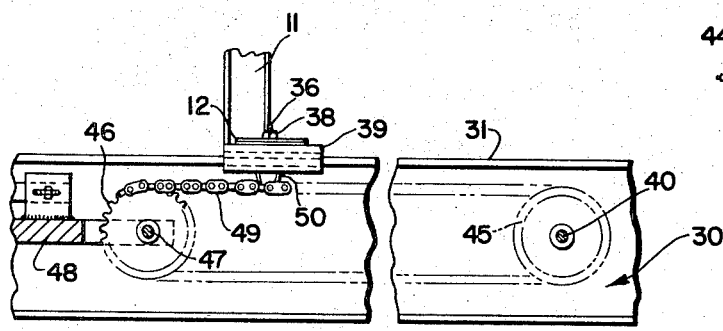
FIG. 6 is a fragmentary longitudinal sectional view, taken substantially along a plane as indicated by the line 6—6 of FIG. 4.
Figure 7:
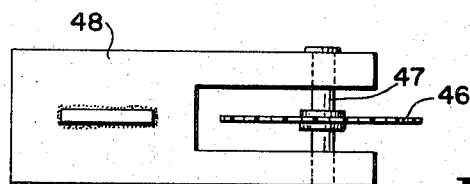
FIG. 7 is an enlarged plan view of a part of the structure shown in FIG. 6.

A shaft 40 is journaled in aligned bearings 41 which are mounted in and extend through the webs of the center beams 30. One end of the shaft 40 is secured non-rotatably in an inner end of a socket 42 which extends through and is journaled in one side member 43 of the platform 28. A hand crank 44 detachably connects non-rotatably to the outer end of the socket 43. A pair of sprocket wheels 45 are secured on the shaft 40 on remote sides of the center beams 30, and a second pair of sprocket wheels 46, one of which is shown in FIGS. 6 and 7, are mounted on shafts 47 which are rotatably supported in the forks of brackets 48. The brackets 48 are adjustably supported at the forward end of the platform 28, as seen in FIG. 8, as being suspended from the flanges 31. Endless chains 49 are trained over the sprockets 45 and 46 which are disposed in longitudinal alignment. The upper flight of each chain 49 is connected by a bracket member 50, FIG. 6, to the angle member 39 disposed thereabove, for connecting the chains to the plates 12 and thus to the bulkhead 10.

The crank 44 can be turned for moving the bulkhead 10 to the forward end of the platform 28, after which the trailer 28 can be loaded. The crank 44 is then turned in the oppoiste direction for moving the bulkhead rearwardly and into abutting engagement with the forward end of the load 51, FIG. 2. The sides 15 are then swung rearwardly and inwardly against the forward portion of the sides of the load 51. The chains 26 are then passed through corresponding conventional stake pockets 52 on opposite sides of the platform deck 29 and the hooks 27 are engaged with the chains 26 to anchor the remote ends of the cables 24 to the deck 29, as illustrated in FIG. 2. A conventional chain-tightening 53 is then engaged with spaced portions of the chain 25 and is actuated in a conventional manner for drawing up and tightening the chain 25, as seen in FIG. 2, for securely anchoring the bulkhead 10 immovably to the platform 28 and in abutting engagement with the forward end of the load 51. The crank 44 is removed and stored while the trailer is in transit.

The bulkhead 10 could be moved manually without the sprocket wheels, chains and crank, and various other modifications and changes are contemplated and may be resorted to, without departing from the function or scope of the invention.

I claim as my invention:

1. A bulkhead for freight carrying trailers comprising a pair of rigid uprights, means mounting said uprights on the center beams of a trailer platform, an elongated rigid frame extending across and secured to said uprights and supported thereby crosswise of the trailer platform for engagement against an end of a freight load, a pair of side members hingedly mounted on end portions of said frame and swingably movable into positions to embrace portions of the sides of the load, and non-elastic flexible means having end portions adapted to be anchored to side portions of the platform and extending across the exterior of said side members and longitudinally across said frame for anchoring the bulkhead to the platform and against the load.

2. A bulkhead as in claim 1, said non-elastic flexible means including a chain defining an intermediate portion thereof and a chain tightener engaging and drawing portions of said chain together for shortening and thereby tightening the flexible member.

3. A bulkhead as in claim 2, said non-elastic means also including chains defining end portions thereof for engaging detachably through stake pockets of the trailer platform and having hooks connected to terminal ends thereof for engagement with said chains for anchoring the chains to said pockets.

4. A bulkhead as in claim 1, said means mounting the uprights on the center beams including plates secured to the lower ends of said uprights, and anti-friction bearing means supporting the plates on the center beams for free movement of the bulkhead thereon longitudinally of the platform.

5. A bulkhead as in claim 4, and means secured to said plates and slidably engaging under portions of the center beams for slidably connecting the plates and bulkhead non-detachably to the center beams.

6. A bulkhead as in claim 5, and manually actuated means comprising a crank actuated sprocket wheel and chain drive for moving the bulkhead longitudinally of the trailer platform.

7. A bulkhead as in claim 1, said uprights comprising I-beams, said elongated rigid frame having longitudinal sides secured to the webs thereof.

* * * * *